(12) United States Patent
Suzuki

(10) Patent No.: US 12,248,840 B2
(45) Date of Patent: Mar. 11, 2025

(54) READER, PROGRAM, AND UNIT

(71) Applicant: Asterisk, Inc., Osaka (JP)

(72) Inventor: Noriyuki Suzuki, Osaka (JP)

(73) Assignee: Asterisk, Inc., Osaka (JP)

( * ) Notice: Subject to any disclaimer, the term of this patent is extended or adjusted under 35 U.S.C. 154(b) by 25 days.

(21) Appl. No.: 17/353,951

(22) Filed: Jun. 22, 2021

(65) Prior Publication Data

US 2021/0312148 A1 Oct. 7, 2021

Related U.S. Application Data

(63) Continuation of application No. 16/088,088, filed as application No. PCT/JP2017/024411 on Jul. 3, 2017, now abandoned.

(30) Foreign Application Priority Data

Aug. 9, 2016 (JP) .................. 2016-156369

(51) Int. Cl.
*G06K 7/10* (2006.01)
*H04M 1/02* (2006.01)

(52) U.S. Cl.
CPC ..... *G06K 7/10386* (2013.01); *G06K 7/10732* (2013.01); *G06K 7/10831* (2013.01); *H04M 1/0264* (2013.01); *G06K 2207/1011* (2013.01); *H04M 2250/52* (2013.01)

(58) Field of Classification Search
CPC ............. H04M 1/0264; H04M 1/0272; H04M 1/2755; H04M 2250/52; H04M 2250/54
See application file for complete search history.

(56) References Cited

U.S. PATENT DOCUMENTS

| | | | |
|---|---|---|---|
| 9,779,276 | B2 | 10/2017 | Todeschini |
| 9,811,703 | B2 | 11/2017 | Powell |
| 9,990,523 | B2 | 6/2018 | Gifford |
| 9,990,526 | B2 | 6/2018 | Gifford |
| 2006/0081712 | A1 | 4/2006 | Rudeen |
| 2007/0164115 | A1 | 7/2007 | Joseph |
| 2013/0161397 | A1 | 6/2013 | Bremer |
| 2014/0131444 | A1 | 5/2014 | Wang |

(Continued)

FOREIGN PATENT DOCUMENTS

| | | |
|---|---|---|
| JP | 2006-277478 A | 10/2006 |
| JP | 2011-60101 A | 3/2011 |
| JP | 2015-219697 A | 12/2015 |

OTHER PUBLICATIONS

The International Search Report for the corresponding international application No. PCT/JP2017/024411, issued on Sep. 19, 2017.

*Primary Examiner* — Thien M Le
*Assistant Examiner* — April A Taylor
(74) *Attorney, Agent, or Firm* — Global IP Counselors, LLP

(57) ABSTRACT

A reader includes a smartphone configured to read information from an image of a symbol included in a photographed image created by a camera module, and a unit attached to the smartphone. The unit includes a semiconductor laser to display a marker in a photographing range of the camera module. A user simply adjusts the orientation of the reader so that the marker overlaps on the symbol for reading processing of the smartphone, whereby information can be read from the symbol.

17 Claims, 11 Drawing Sheets

(56) References Cited

U.S. PATENT DOCUMENTS

| | | |
|---|---|---|
| 2015/0186703 A1 | 7/2015 | Chen |
| 2015/0220766 A1 | 8/2015 | Russell |
| 2015/0356336 A1 | 12/2015 | Hoobler |
| 2016/0292477 A1 | 10/2016 | Bidwell |
| 2016/0300090 A1 | 10/2016 | Gifford et al. |
| 2017/0041528 A1* | 2/2017 | Lai ........................ H04N 5/243 |
| 2017/0053340 A1 | 2/2017 | Nakamura et al. |

* cited by examiner

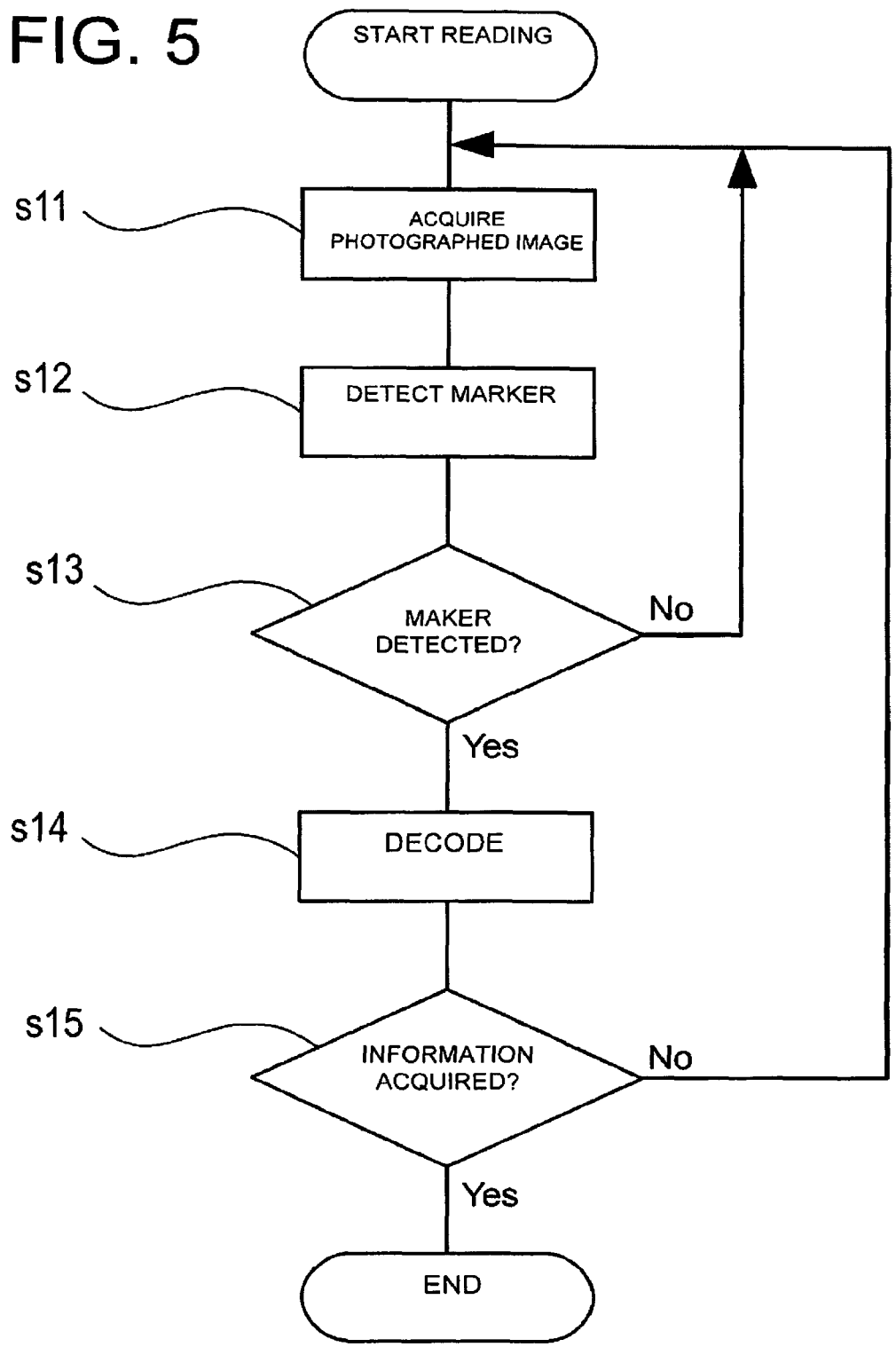

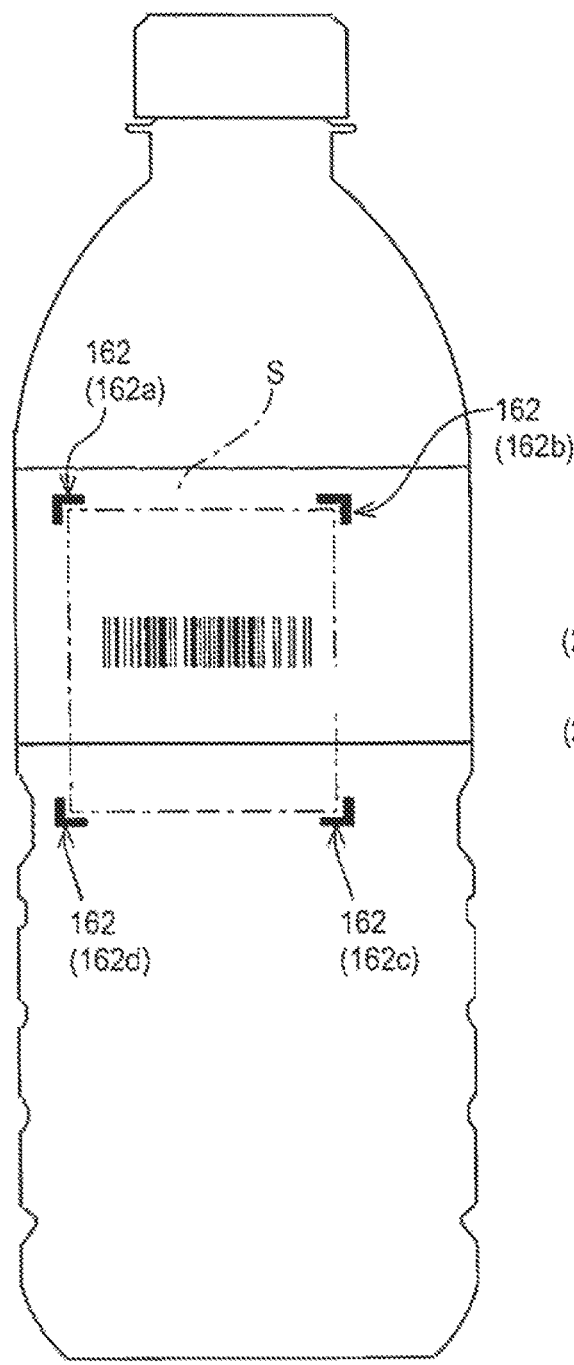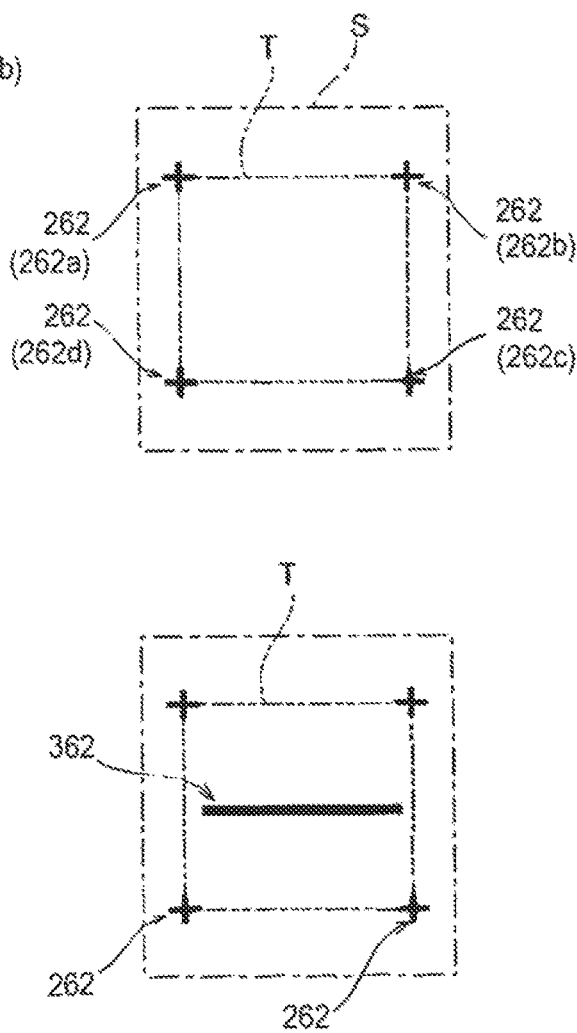

READER, PROGRAM, AND UNIT

CROSS-REFERENCE TO RELATED APPLICATIONS

This application is a continuation of U.S. patent application Ser. No. 16/088,088, filed Sep. 25, 2018, which is a U.S. National stage application of PCT/JP2017/024411, filed Jul. 3, 2017, which claims priority to Japanese Patent Application No. 2016-156369, filed Aug. 9, 2016, the entire contents of each of which are hereby incorporated herein by reference.

BACKGROUND

Field of the Invention

The present invention relates to a reader, a program and a unit configured to read information from a symbol, such as a one-dimensional symbol or a two-dimensional symbol.

Background Information

Readers have been conventionally known. To read information from a symbol on an article, such a reader includes a digital camera externally attached to an information processing terminal, such as a desktop PC or a laptop PC. The information processing terminal includes an acquisition unit to acquire an image taken by a digital camera, and a decoding unit to analyze the taken image to decode a symbol included in the image. Information obtained by decoding the symbol is used in information processing for various purposes, such as inventory management and sales management.

Recently smartphones coming with a built-in camera module have been used for the reader. Similarly to the information processing terminal as stated above, such a smartphone includes an acquisition unit to acquire a taken image from the camera module, and a decoding unit to decode a symbol included in the image. Japanese Patent Application Publication No. 2015-219697A describes a technique of enabling online shopping with such a smartphone.

SUMMARY

When a user uses a conventional reader including an external digital camera attached to an information processing terminal or such a smartphone, the user is required to adjust the position of a symbol on a subject while checking an image on the display, and so has difficulty in intuitive reading operation. Especially the amount of information to be processed increases because of the image pickup device with high pixel density, and this delays the creation of an image or increases the load for decoding to detect a symbol, and so causes the delay of displaying of the image on the display. As a result, the user cannot get the position of the symbol relative to the camera in real time, and may feel stress because of the difficulty in positioning.

Such a problem occurs not only for a one-dimensional symbol or a two-dimensional symbol, but for other symbols such as letters and marks on articles when an image of these symbols is taken with a camera to acquire information from the symbols.

The present invention aims to provide a reader, a program and a unit enabling an intuitive reading operation.

Solution to Problem

To solve the above problem, a reader of the present invention includes: a computer configured to analyze an image created by a camera module and read information from a symbol included in the image; and a unit including a light source to display a marker indicating a range photographed by the camera module, the unit being separate from the computer.

In the reader of the present invention, the computer may be a mobile terminal, and the unit may be externally attached to the mobile terminal.

In the reader of the present invention, the unit may include the camera module and the unit may transmit the image to the computer.

In the reader of the present invention, the marker may include: a range marker indicating a readable range of the symbol by the computer, and a linear marker laterally extending in the range marker.

In the reader of the present invention, the marker may include: a range marker indicating a readable range of the symbol by the computer, and a center marker indicating a center of the range marker.

In the reader of the present invention, the computer may include an acquisition unit configured to acquire the image from the camera module; a detection unit configured to detect the linear marker included in the acquired image; and a decoding unit configured to perform decoding of pixels at the detected linear marker.

In the reader of the present invention, the computer may include: an acquisition unit configured to acquire the image from the camera module; a detection unit configured to detect the range marker included in the acquired image; and a decoding unit configured to perform decoding of pixels in the detected range marker.

In the reader of the present invention, the camera module may include a focus adjustable lens, and the computer may include: a memory unit configured to store a correspondence between distance information indicating reading distances for the symbol and focusing positions of the lens; an input unit configured to encourage a user to input the distance information; and a setting unit configured to find a focusing position of the lens corresponding to the input distance information based on the correspondence and configure the camera module to move the lens to the focusing position.

A program of the present invention that makes the computer of the reader execute the following steps of: acquiring the image from the camera module; detecting an image of the marker from the acquired image; and when detecting an image of the marker, reading information from the symbol.

A unit in the present invention is configured to operate with a computer configured to read information from a symbol included in an image created by a camera module, the unit including a light source configured to output a marker indicating a range photographed by the camera module.

Advantageous Effects of Invention

According to the present invention, a marker indicating a photographing range of a camera module is displayed during a reading operation. Therefore, the user can simply adjust the position of the marker with the symbol to read information. Therefore, the user can perform an intuitive reading operation.

BRIEF DESCRIPTION OF DRAWINGS

FIG. 5 is a flowchart of the operation of the smartphone.

FIG. 8A shows a display mode of a marker according to Modified Example 1, FIG. 8B shows another display mode and FIG. 8C shows still another display mode.

DETAILED DESCRIPTION

First Embodiment

Figure 1:
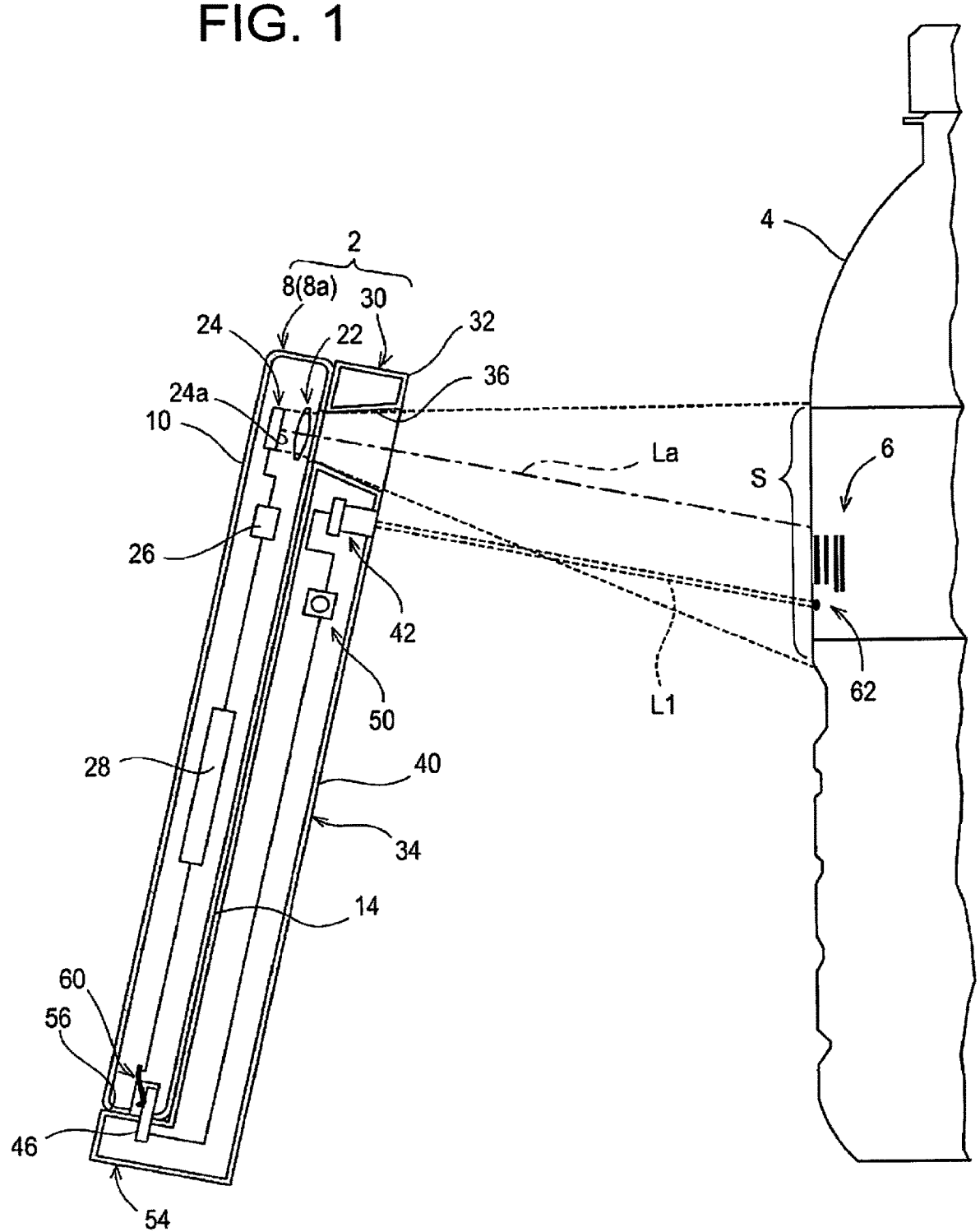
FIG. 1 schematically shows a reader according to a first embodiment.

Referring to the drawings, the following describes a reader, a program and a unit of the present invention, by way of embodiments.

Figure 2:
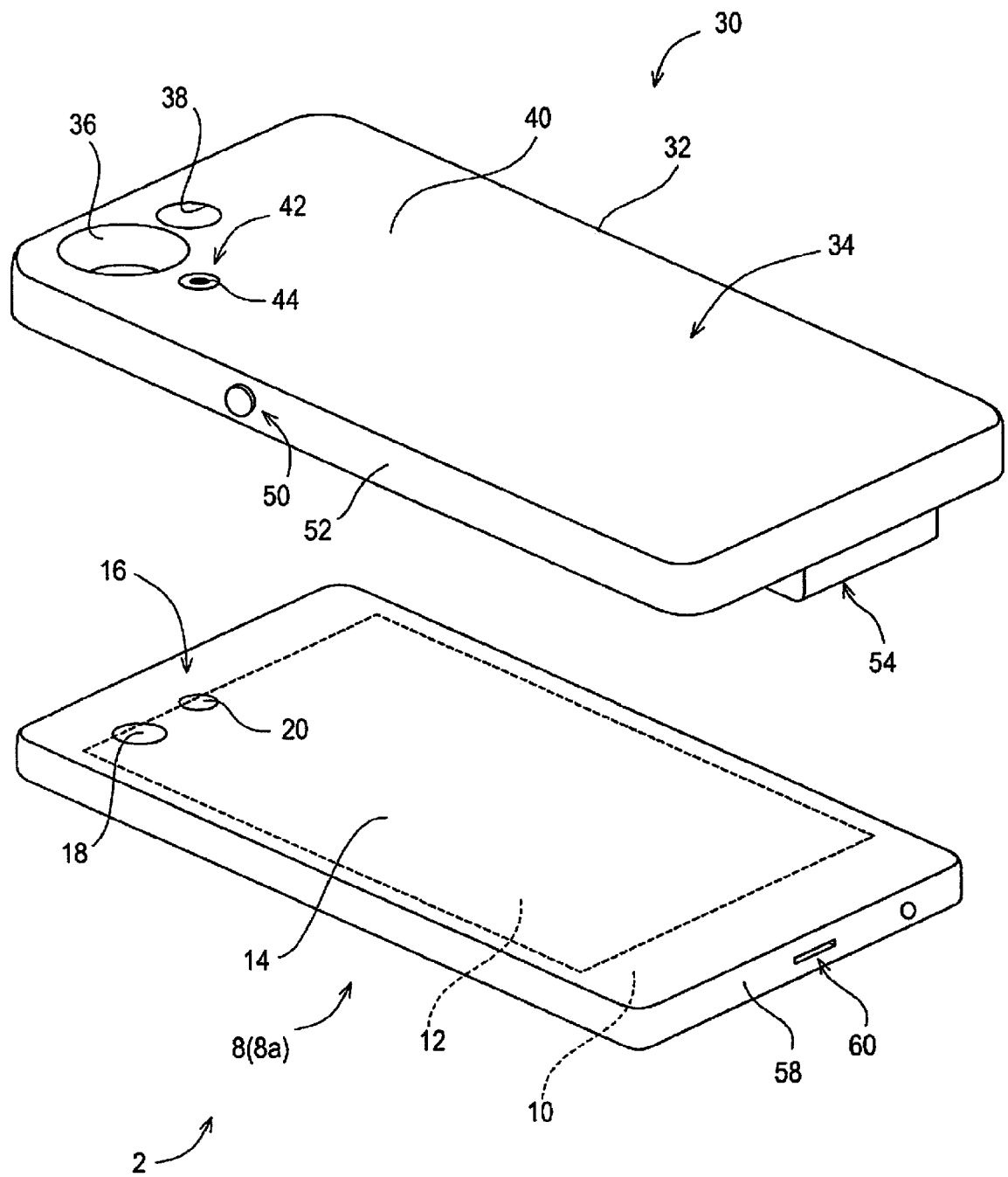
FIG. 2 is a perspective view of a smartphone and a unit that make up the reader.

As shown in FIGS. 1 and 2, a reader 2 of the present embodiment reads information from a one-dimensional symbol 6 (hereinafter simply called a "symbol 6") on an article 4 (in this example, printed on a label of a plastic bottle). This reader includes a smartphone 8a as a mobile terminal and a unit 30.

The smartphone 8a is a plate-like information terminal of a size allowing a user to hold it with one hand, and includes a liquid crystal display 12 on the front face 10. The smartphone has a large round window 18 and a small round window 20 at an upper edge 16 (one of short edges) on the rear face 14. The small round window 20 internally includes a light source (not illustrated) for flash.

The large round window 18 internally includes a lens 22 and an image pickup device 24 disposed in this order from the rear face 14 so that the lens 22 is opposed to the imaging surface 24a of the image pickup device 24. The centers of the round window 18 and of the imaging surface 24a of the image pickup device 24 are on the center line of the lens 22, and this center line is an optical axis La of the light-receiving system. With this configuration, light incident on the round window 18 passes through the lens 22 to form an image on the imaging surface 24a of the image pickup device 24. This example includes a single lens 22, and may include a plurality of lenses.

Figure 3:
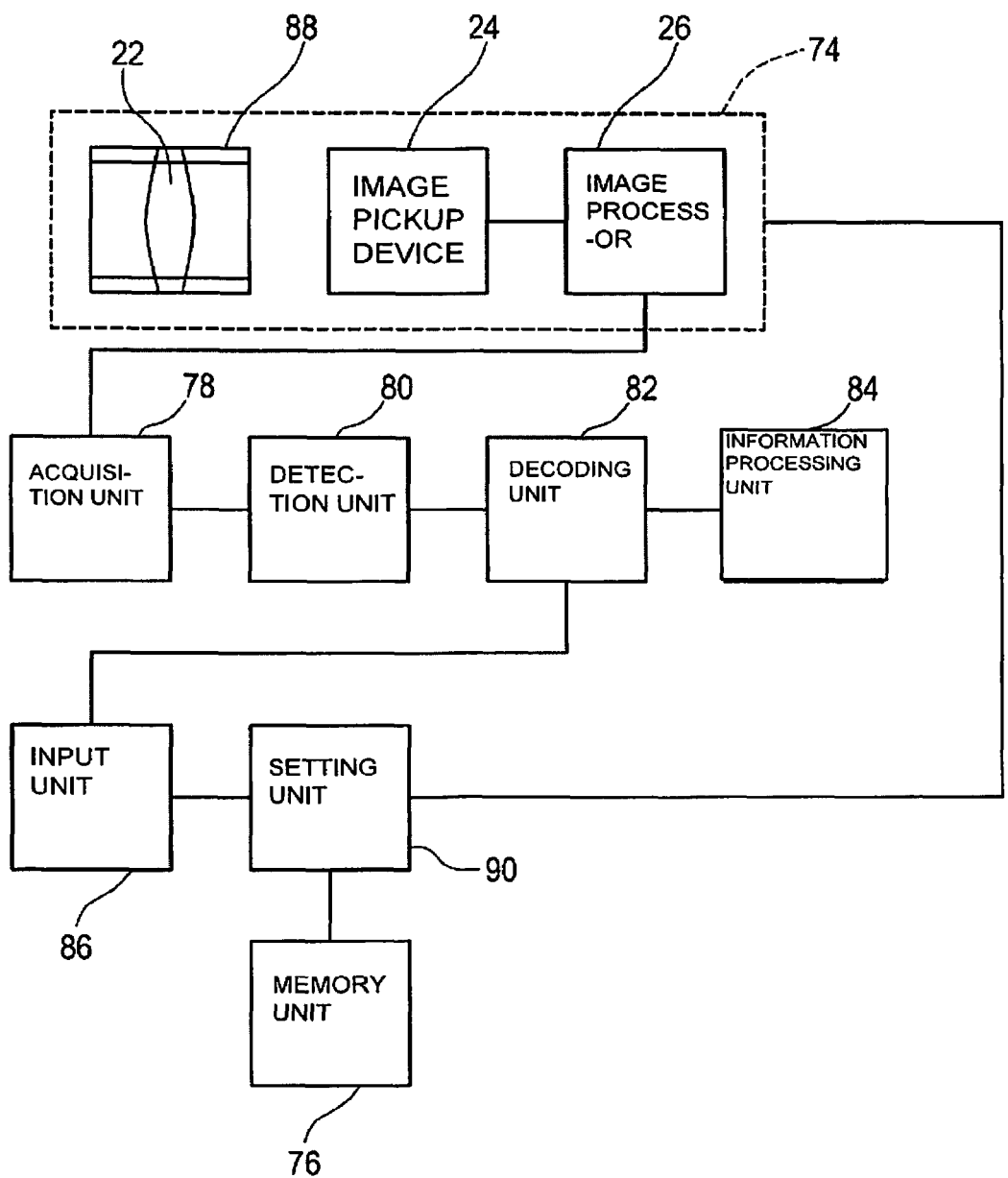
FIG. 3 is a block diagram of the reader.

The image pickup device 24 is a sensor including a plurality of two-dimensionally arranged light-receiving elements, such as CCD image pickup devices and CMOS image pickup devices. The image pickup device is electrically connected to an image processor 26, and converts light that forms an image on the imaging surface 24a into an electrical signal in accordance with a command from the image processor 26 and inputs the electrical signal to the image processor 26. The image processor 26 creates an image (hereinafter called a "photographed image") based on the input electrical signal. As shown in FIG. 3, the lens 22, the image pickup device 24 and the image processor 26 make up a camera module 74. The camera module 74 is electrically connected to a main board 28 of the smartphone 8a (FIG. 1).

On the main board 28, a central processing unit (hereinafter called a "CPU") not illustrated and a memory as a memory unit 76 (FIG. 3) are mounted, for example. The memory stores a reading program according to the present embodiment beforehand. In this example, the CPU executes the reading program stored in the memory so as to function as an acquisition unit 78 to acquire a photographed image from the image processor 26, a detection unit 80 to detect an image of a marker (hereinafter called a "marker image") included in the acquired photographed image, and a decoding unit 82 to decode an image of the symbol 6 (hereinafter called a "symbol image") included in the photographed image, as shown in FIG. 3.

Referring back to FIGS. 1 and 2, a unit 30 according to the present embodiment is externally attached to such a smartphone 8a. The unit 30 is separate from the smartphone 8a. The unit includes a case 32 that incorporates a semiconductor laser 42 and a connector 46.

The case 32 has a base 34 and a connector unit 54. The base 34 is a plate-like member having width substantially equal to the smartphone 8a and length slightly longer than the smartphone 8a, and is disposed along the rear face 14 of the smartphone 8a. The base 34 has through holes 36 and 38 that penetrate through the base in the thickness direction. The through holes 36 and 38 are positioned so as to expose the large and small round windows 18 and 20, respectively, of the smartphone 8a when the case 32 is placed along the rear face 14 of the smartphone 8a. The through hole 36 has a partial cone shape, and the center of the through hole is on the optical axis La (center line of the lens 22) of the light-receiving system. Light incident on such a through hole 36 passes through the lens 22 to form an image on the imaging surface 24a of the image pickup device 24. The through hole 38 has a diameter larger than that of the small round window 20, and the center of this through hole is on the center axis of the small round window 20.

Figure 4A:
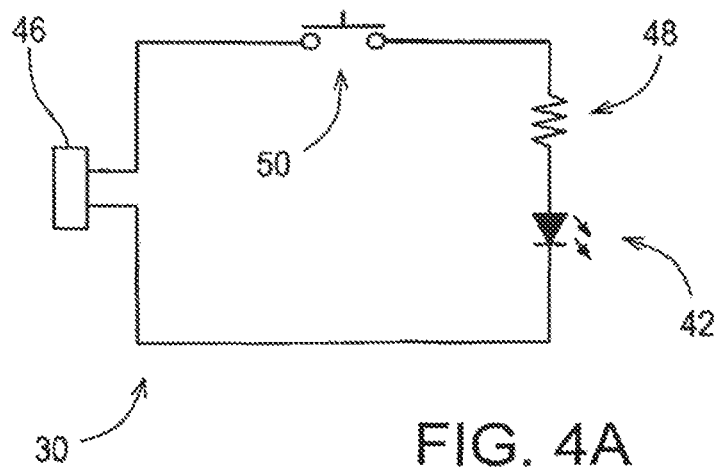
FIGS. 4A and 4B schematically show the configuration of a circuit in the unit.

On the rear face 40 of the base 34 at a position close to the large and small through holes 36 and 38, an emission window 44 is exposed, through which the semiconductor laser 42 emits red laser light L1 in parallel with the optical axis La. As shown in FIG. 4A, the semiconductor laser 42 has a cathode connected to the ground terminal of a connector 46 and an anode connected to one end of a switch 50 via a resistor 48. The other end of the switch 50 connects to the power-supply terminal of the connector 46. The switch 50 is disposed at a lateral face 52 of the base 34 (FIG. 2), and the user operates this switch.

Referring back to FIGS. 1 and 2, the connector 46 is disposed at the connector unit 54 of the case 32. The connector unit 54 sticks out from the base 34 toward the smartphone 8a. The connector 46 protrudes from one lateral face 56 of the connector unit 54 so that the connector is parallel to the base 34. The unit 30 can be attached to the smartphone 8a by inserting the connector 46 of the unit 30 into a connector 60 of the smartphone 8a at the lower face 58 of the smartphone. This can define the reader 2 of the present embodiment.

The reader 2 is configured so that the unit 30 receives electricity from the smartphone 8a through the connectors 60 and 46. When the user operates the switch 50, the semiconductor laser 42 of the unit 30 receiving electricity emits light or stops emitting light. Laser light L1 emitted from the semiconductor laser 42 illuminates a part of the photographing range S of the camera module 74. Thereby the photographing range S displays a dot-like marker 62.

The smartphone 8a executes the reading processing shown in FIG. 5 while displaying the marker 62 at the photographing range S. This reading processing is executed at predetermined timing by various applications to implement information processing (services) based on the information of the symbol 6 (hereinafter called "symbol information").

Firstly the CPU of the smartphone 8a acquires a photographed image from the camera module 74 (FIG. 3) (s11). More specifically the CPU transmits a command to request a transmission of a photographed image to the image processor 26. When receiving such a command, the image processor 26 controls the image pickup device 24 to convert the light that forms an image on the imaging surface 24a into an electrical signal and creates a photographed image based on the electrical signal. Then the image processor transmits the created photographed image to the CPU.

Next, the CPU of the smartphone 8a performs detection processing to detect a marker image from the acquired photographed image (s12). When the photographed image is represented in a RGB color space, for example, the detection processing determines an assembly of the pixels having a higher R value than a predetermined threshold as a marker image. During this detection processing, if no marker image is detected (s13: No), the CPU determines that this is not a timing for reading because the user did not operate for emission of the semiconductor laser 42, or determines that the article 4 (reading target) is not at an appropriate position (too close or too far). Then the CPU acquires a photographed image (s11) again. When a marker image is detected (s13: Yes), the CPU performs decoding processing (s14).

The decoding processing (s14) detects a symbol image included in the photographed image and reads information from the detected symbol image in accordance with predetermined decoding algorithm (e.g., reference decode algorithm specified in JISX0507). If detection of a symbol image fails or an error occurs during decoding (s15: No), the CPU repeats the procedure from the acquisition of a photographed image (s11) to the decoding processing (s14).

When the CPU performs decoding successfully (s15: Yes), i.e., acquires symbol information, the CPU ends the reading processing and executes information processing based on the read information. In this way, the CPU functions as an information processing unit 84 (FIG. 3).

Figure 6:
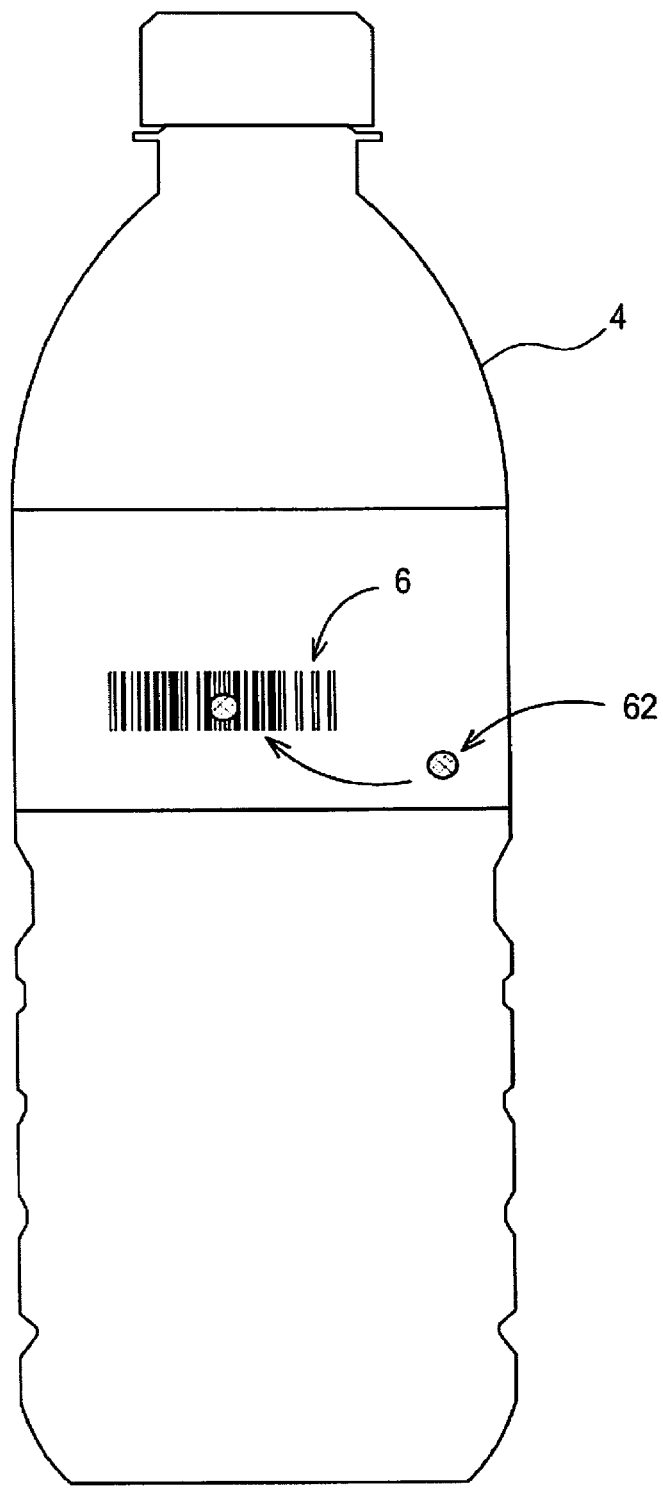
FIG. 6 shows a marker formed with laser light from the unit.

The reader 2 of the present embodiment is configured so that, when the user operates the switch 50 of the unit 30, the semiconductor laser 42 of the unit 30 emits laser light L1 so that a dot-like marker 62 is displayed in the photographing range S of the camera module 74 as shown in FIG. 1. Then the user adjusts the orientation of the reader 2 so that the marker 62 overlaps on the symbol 6 as shown in FIG. 6. This can position the symbol 6 within the photographing range S of the camera module 74 for reading of symbol information.

In this way, the reader 2 of the present embodiment allows the user to adjust the position of the reader (find the target for positioning) while directly seeing the article 4 and the marker 62. Therefore the user can perform an intuitive reading operation. This can avoid the problem of difficulty in positioning of a symbol, which may occur when the displaying of an image on the liquid crystal display 12 is delayed.

It should be noted here that a readable distance from the symbol 6 depends on the resolution of the image pickup device 24 and the angle of view of the lens 22.

The following describes a second embodiment of the present invention. In the following description, like reference numerals designate like parts of the first embodiment as stated above, and their description is omitted or is given only if needed.

Second Embodiment

Figure 7A:
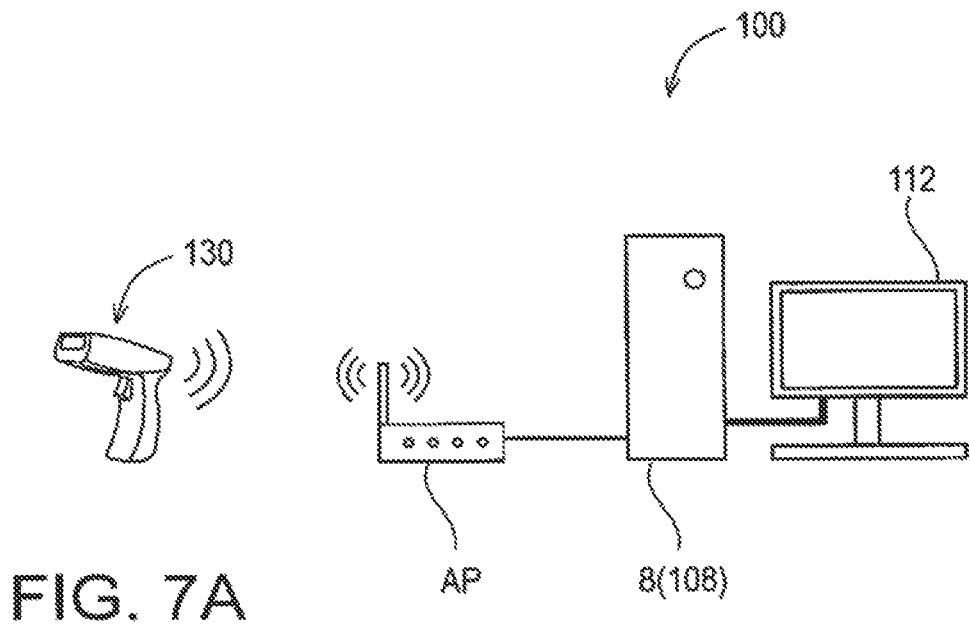
FIGS. 7A and 7B schematically show a reader according to a second embodiment.
Figure 7B:
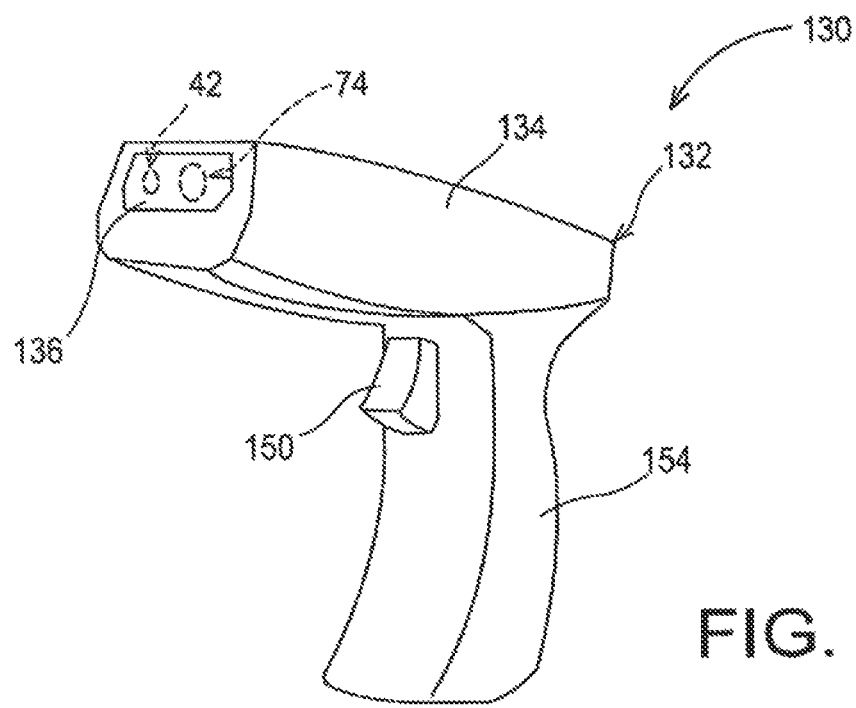

The above first embodiment describes the unit 30 that is externally attached to the smartphone 8a as a computer 8. As shown in FIGS. 7A and 7B, a reader 100 of the second embodiment includes a well-known desktop PC 108 as a computer 8 and a unit 130.

The unit 130 operates together with the desktop PC 108 in use, and the unit can communicate with the desktop PC 108 via an access point AP. The unit 130 has a case 132 that incorporates a semiconductor laser 42, a camera module 74, a trigger switch 150, a microcomputer (not illustrated), a communication module (not illustrated), and a power-supply circuit (not illustrated). A typical communication module is a Wifi module as a non-limiting example, which may be a wireless communication module such as Bluetooth (registered trademark) module or a wire communication module such as a USB.

The case 132 is shaped like a gun, and includes a grip 154 having the trigger switch 150 thereon and a barrel 134 that horizontally extends from the upper end of the grip 154. The barrel 134 includes the semiconductor laser 42 and the camera module 74 at the distal end, and these semiconductor laser 42 and camera module 74 are disposed close to each other so that the laser light from the semiconductor laser and the optical axis of the camera module are parallel to each other. The barrel 134 has a window 136 at the muzzle to emit the laser light and to allow light to be incident on the camera module 74.

Figure 4B:
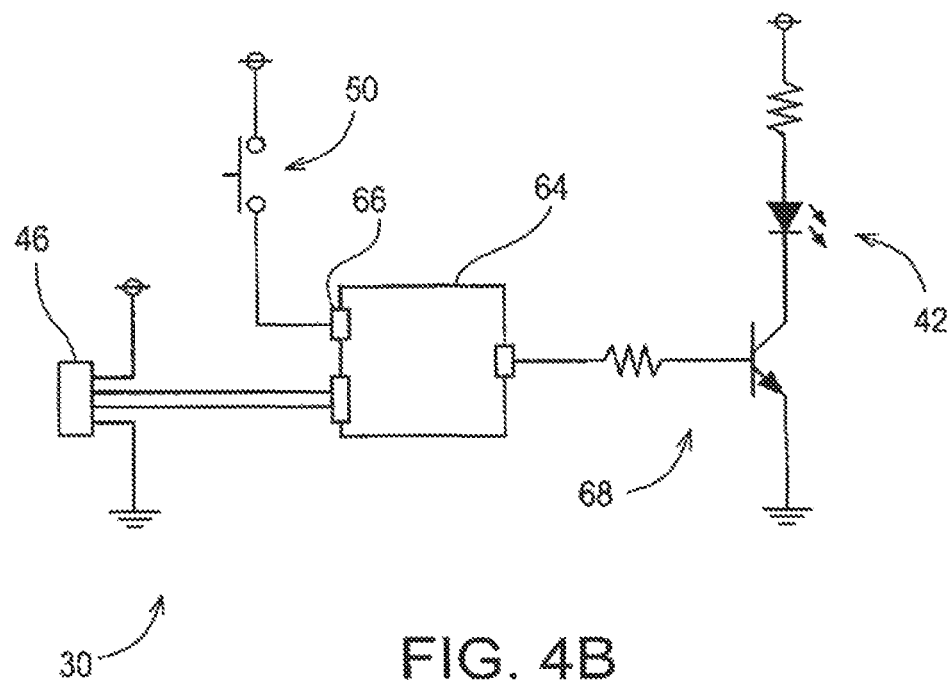

The output from the trigger switch 150 connects to the input of the microcomputer (e.g., input terminal 66 of the microcomputer 64 in FIG. 4B). When the user depresses the trigger switch 150, the microcomputer receives ON signal as an input. The microcomputer is electrically connected to a control circuit (e.g., control circuit 68 in FIG. 4B) to control the light-emission of the semiconductor laser 42. When the microcomputer detects ON signal from the trigger switch 150, the microcomputer outputs a signal to make the semiconductor laser 42 emit light. As a result, the semiconductor laser 42 emits light, and the laser light is emitted through the muzzle.

This microcomputer is electrically connected to an image processor 26 of the camera module 74. When the microcomputer detects ON signal from the trigger switch 150, the microcomputer transmits a command to start imaging to the image processor 26. When receiving such a command to start imaging, the image processor 26 controls the image pickup device 24 to create a photographed image at a predetermined frame rate. The communication module transmits the created photographed image to the desktop PC 108.

When acquiring the photographed image, the CPU of the desktop PC 108 executes the processing similar to the first embodiment (s12) to (s15) to read information from a symbol 6 and execute information processing based on the information.

In the reader 100 of the present embodiment, when a user depresses the trigger switch 150, the semiconductor laser 42 emits light so as to display a marker 62 in the photographing range S of the camera module 74 as shown in FIG. 6. This reader therefore allows the user to adjust the position of the reader while directly seeing the article 4 and the marker 62, and the user can perform an intuitive reading operation.

The following describes modified examples of the above embodiments. In the following description of modified examples, like reference numerals designate like parts of the above embodiments as stated above, and their description is omitted or is given only if needed.

Modified Example 1

The above embodiments describe the dot-like marker 62 displayed by the light source, and the shape of the marker is not limited to such a dot, which may be other shapes, such as a cross shape, an arrow shape and a linear shape. The number of the marker also is not limited to one, and a plurality of markers may be displayed.

For instance, as shown in FIGS. 8A and 8B, four markers 162a to 162d or 262a to 262d may be displayed in the photographing range to indicate a readable range for a user. To display these markers 162a to 162d or 262a to 262d, four light sources 42 may be disposed close to the through hole 38 in the first embodiment, and these light sources 42 may be mounted so as to be directed toward the photographing range S, for example. In FIG. 8A, the optical axes of the light sources 42 are set along the angle of view of the optical system so as to indicate the range substantially equal to the photographing range S with the markers 162a to 162d. In FIG. 8B, the optical axes of the light sources 42 are set toward the optical axis L1 of the optical system so as to display the markers 262a to 262d at a specific range T (center area) in the photographing range S. In order to have the markers of any desired shape, the emission window 44 of each light source 42 may have a slit corresponding to the shape of the marker, and light may be shielded at a part other than the slit of the emission window 44. These plurality of markers 162a to 162d or 262a to 262d function as range markers 162, 262 to indicate a readable range for a user.

In another example, as shown in FIG. 8C, the range marker 262 to indicate a readable range (specific range T) as well as a linear marker 362 laterally extending in the readable range may be displayed at the same time. To display such a linear marker 362, a rod-like slit may be formed at the rear face 40 of the base 34, for example, and a plurality of light sources 42 may be disposed behind the slit. Alternatively, the range marker 262 and a dot-like or a cross-shaped center marker (not illustrated) indicating the center of the range marker 262 may be displayed at the same time.

The light sources to display the markers 62, 162, 262, and 362 are not limited to the semiconductor laser 42, which may be a LED configured to illuminate a part of the photographing range S of the camera module 74. The semiconductor laser 42 and a LED may be used together. The emission window 44 and the window 136 for light may have a slit corresponding to the shape of the marker 62, 162, 262 or 362. For the LED, a LED having high directivity is preferable. The color of light emitted from the light source is not limited to red, which may be other colors of visible light.

Modified Example 2-1

In the embodiment to display a range marker 262 indicating a specific range T on the subject, only an image in the specific range T may be decoded. The following describes this specifically. When the camera module 74 takes an image of the subject, a photographed image including four markers 262a to 262d is created. The CPU (acquisition unit 78) of the computer 8 acquires the photographed image. The CPU (detection unit 80) executes the detection processing (s13). The detection processing (s13) specifies four assembly parts including the pixels having a high R value, and detects these parts as four images of the markers 262a to 262d. Then the CPU (decoding unit 82) executes the decoding processing. The decoding processing firstly finds coordinates of the images of these markers 262a to 262d (hereinafter called "marker coordinates"), and detects a symbol image from the pixels in the quadrangular range having these four marker coordinates at the corners or in the quadrangular range including these four marker coordinates in their sides, for example. This can omit the decoding processing of the pixels other than the specific range T, which therefore can improve the processing rate of the decoding processing. It should be noted here that the coordinates typically refer to the positions in the orthogonal coordinates having the upper left corner of the photographed image as the origin. This is a not-limiting example, and the coordinates may be calculated in the orthogonal coordinates having the center of the photographed image as the origin. The marker coordinates may be coordinates of any one of pixels that are determined as a marker image.

Modified Example 2-2

In the embodiment to display a linear marker 362 on the subject, an image at the part displaying the linear marker 362 may be decoded. The following describes this specifically. When the camera module 74 takes an image of the subject, a photographed image including an image of the linear marker 362 is created. The CPU (acquisition unit 78) of the computer 8 acquires the photographed image. The CPU (detection unit 80) executes the detection processing (s13). The detection processing (s13) specifies the pixels forming a linear shape having a higher R value than the surrounding as an image of the linear marker. Then the CPU (decoding unit 82) executes the decoding processing of the specified pixels. This cam omit the decoding processing of the pixels other than the linear marker 362, which therefore can improve the processing rate of the decoding processing.

Modified Example 2-3

In the embodiment to display a range marker 262 and a linear marker 362 at the same time on the subject, any one of the decoding processing of Modified Example 2-1 and Modified Example 2-2 as stated above may be selected for execution. In this case, the CPU of the computer 8 executes, prior to the acquisition processing (s11) of a photographed image, the step of encouraging the user to input the type of a symbol to be read. For instance, the CPU displays a check box for selection of any one of a one-dimensional code and a two-dimensional code on the liquid crystal display 12 or on the monitor 112, and sets a flag corresponding to the selected symbol. In this way, the CPU functions as an input unit 86 (FIG. 3) to encourage the user to input a type of a symbol to be read.

Then the CPU (acquisition unit 78) of the computer 8 performs acquisition processing (s11) of a photographed image. Next, the CPU (detection unit 80) performs the detection processing (s12) of the marker, and the CPU (decoding unit 82) checks the state of the flag before starting the decoding processing. When the flag set indicates a one-dimensional code, the CPU executes the decoding processing of Modified Example 2-2. When the flag set indicates a two-dimensional code, the CPU executes the decoding processing of Modified Example 2-1. In this way, the CPU executes the decoding processing suitable for the symbol to be read, which enables an easy reading operation.

Modified Example 3

In the above embodiments, the camera module 74 may include a well-known focus-adjustable lens unit 88 (FIG. 3), and the CPU of the computer 8 may perform focusing suitable for the reading distance from the subject as the user requested, and execute the reading processing while locking the focusing (focus locking). The following describes this specifically.

Figure 9A:
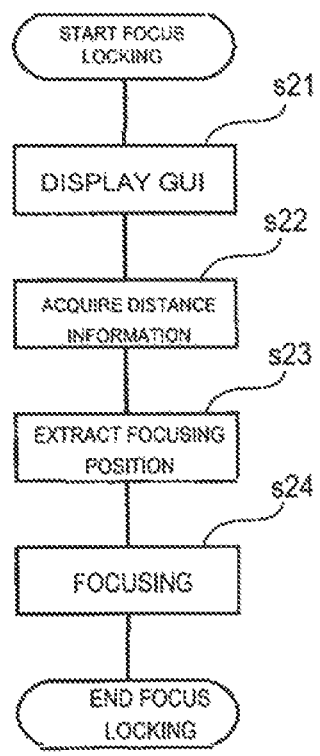
FIG. 9A is a flowchart of the operation of the smartphone in Modified Example 3.
Figure 9B:
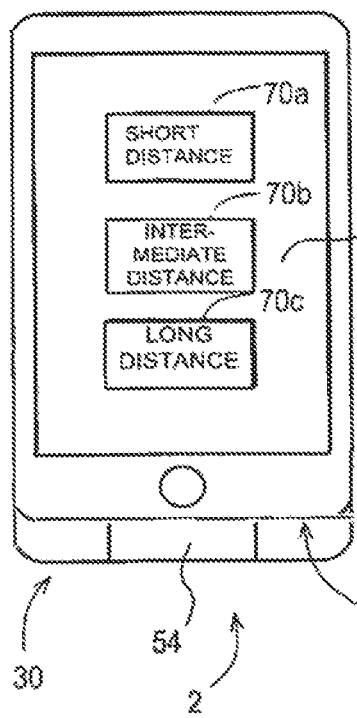
FIG. 9B shows a graphical user interface (GUI) and FIG. 9C. shows another GUI.
Figure 9C:
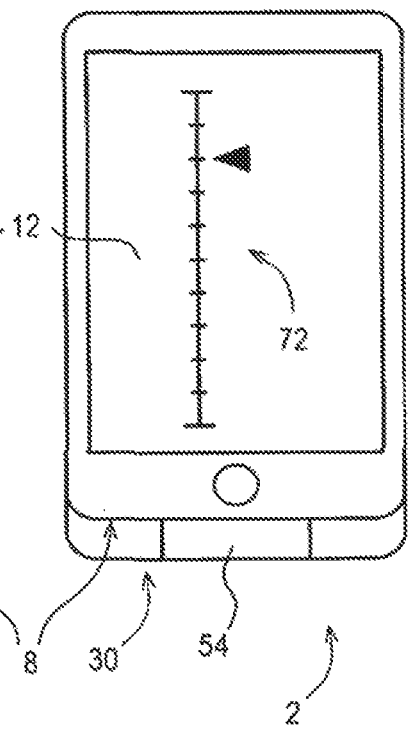

The memory (memory unit 76) stores beforehand the focusing positions of the lens 22 in association with distance information indicating the reading distances from the subject. Then prior to the reading processing, as shown in FIG. 9, the CPU displays a GUI on the liquid crystal display 12 to receive the user's input on distance information (s21) so as to encourage the user to input the distance information. The GUI, for example, includes a push button 70a indicating a short distance, a push button 70b indicating an intermediate distance, and a push button 70c indicating a long distance. When the user selects any one of the push buttons 70a to 70c, the CPU sets a flag corresponding to the selected push button 70a to 70c. The GUI may be of other types, such as a slide bar 72, to set the distance information. When the user operates the slide bar 72, the value indicated on the slide bar 72 is stored as a variable.

Next the CPU extracts a focusing position corresponding to the flag or the distance information set as the variable from the memory (memory unit 76) (s23). Then the CPU transmits a signal to the camera module 74 so as to move the lens 22 to the extracted focusing position (s24). As a result, the focusing of the camera module 74 is locked at the reading distance requested by the user.

As described above, the CPU functions as the input unit 86 to encourage the user to input distance information and as a setting unit 90 (FIG. 3) to find the focusing position corresponding to the input distance information and configure the camera module 74 to move the lens at the focusing position. The lens unit 88 typically includes the lens 22, a magnet (not illustrated) attached to the lens 22, and a coil (not illustrated) to generate a magnetic force to move the magnet forward or backward in accordance with a control signal.

Modified Example 4

Figure 10:
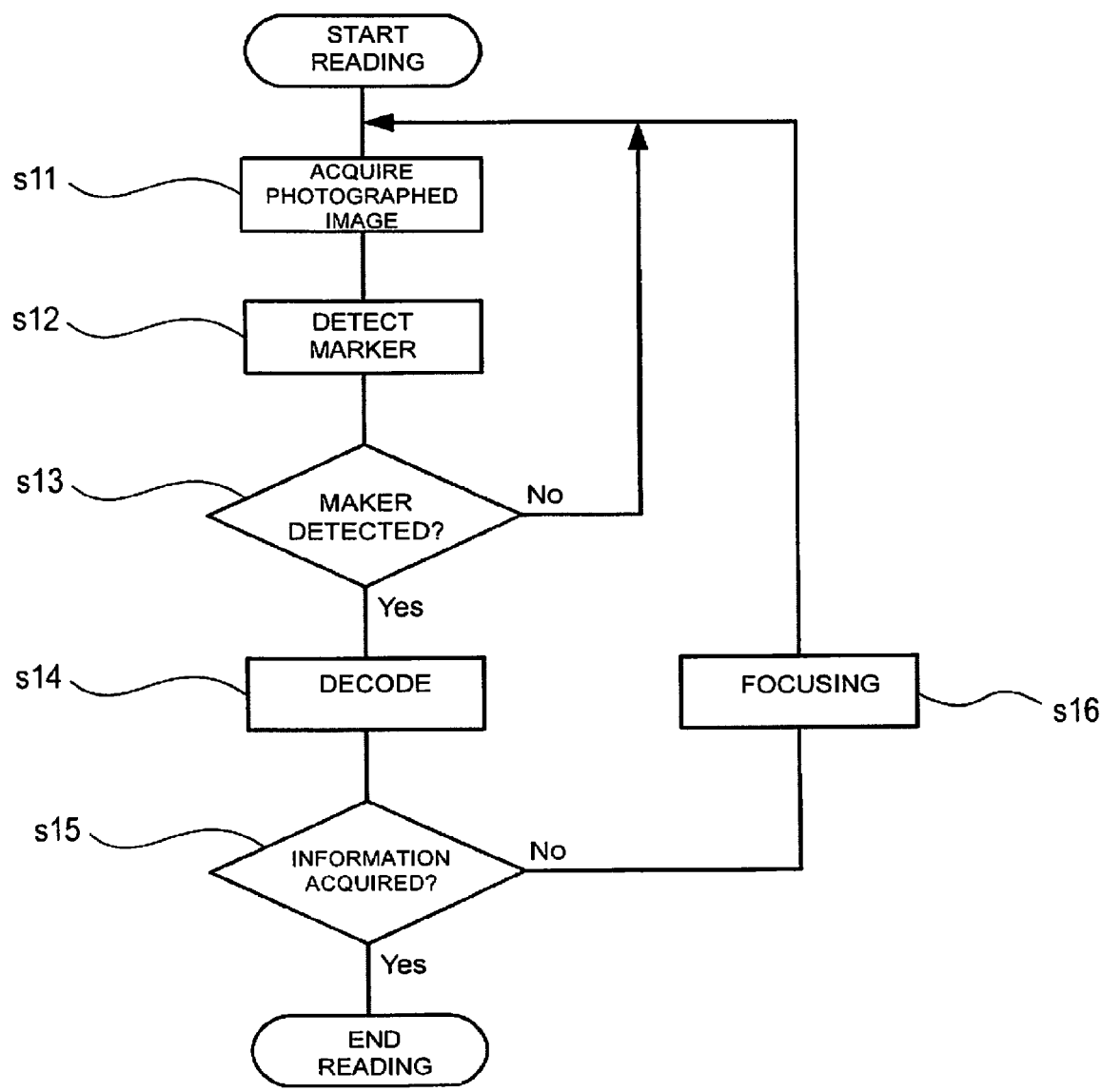
FIG. 10 is a flowchart of the operation of the smartphone in Modified Example 3.

Focusing of the camera module 74 is not limited to the example of Modified Example 3 as stated above, and focusing may be performed based on a marker image in the photographed image. As shown in FIG. 10, the CPU executes the focusing processing (s16) if the acquisition of information fails (s15: No) during the decoding processing (s14) in the reading processing. In the following Modified Example 4-1 to Modified Example 4-5, such focusing processing (s16) is described by way of examples.

Modified Example 4-1

The focusing processing (s16) in this modified example calculates an optimum focusing position based on the marker coordinates in the photographed image. This focuses on the displacement of the marker coordinates depending on the length of the reading distance. More specifically as shown in FIG. 1, when the optical axis La of the light-receiving system and the laser light L1 of the semiconductor laser 42 are parallel, the marker coordinates are positioned close to the center coordinates of the photographed image when the reading distance from the subject is long. As the reading distance decreases, the marker coordinates will be away from the center coordinates. Such a relationship between the marker coordinates and the reading distance may be measured experimentally, and then an optimum focusing position of the lens 22 for each of the measured reading distance values may be measured experimentally. Based on the results of these experiments, a table can be specified, including the optimum focusing position of the lens 22 in association with each marker coordinates. Prior to the focusing processing (s16), such a table is stored in the memory (memory unit 76) of the computer 8. Then the CPU (setting unit 90) of the computer 8 detects a marker image from the photographed image during the focusing processing (s16) and finds the marker coordinates thereof. Then, the CPU extracts the focusing position corresponding to (close to) the marker coordinates from the memory (memory unit 76). The CPU transmits a signal to the camera module 74 so as to move the lens 22 to the extracted focusing position.

Figure 11A:
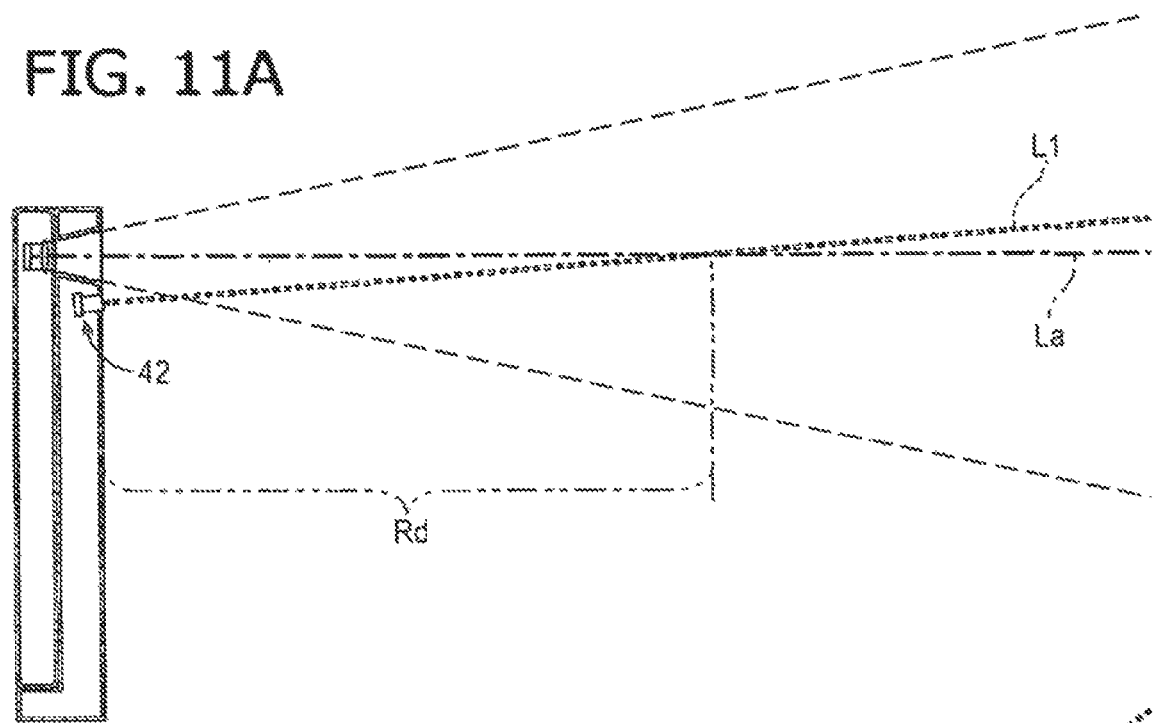
FIGS. 11A and 11B show the optical configuration in Modified Example 4.

This Modified Example (4-1) describes the focusing processing (s16) when the optical axis La of the light-receiving system and the laser light L1 of the semiconductor laser 42 are parallel (FIG. 1). When these optical axes are not parallel, e.g., when the optical axis La of the light-receiving system and the laser light L1 of the semiconductor laser 42 intersect at a predetermined reading distance Rd as shown in FIG. 11A as well, the CPU can calculate the optimum focusing position based on the marker coordinates. In this case, the marker coordinates are positioned at the center coordinates of the photographed image at a predetermined reading distance Rd. As the reading distance Rd increases, the marker coordinates are displaced in one direction from the center coordinates. As the reading distance Rd decreases, the mark coordinates are displaced in the opposite direction from the center coordinates. Such a relationship between the marker coordinates and the reading distance Rd may be measured experimentally, and then an optimum focusing position of the lens 22 for each value of the measured reading distance Rd may be measured experimentally. Based on these experiments, a table can be specified, including the optimum focusing position of the lens 22 in association with each marker coordinates, and prior to the focusing processing (s16), such a table is stored in the memory (memory unit 76) of the computer 8.

Figure 11B:
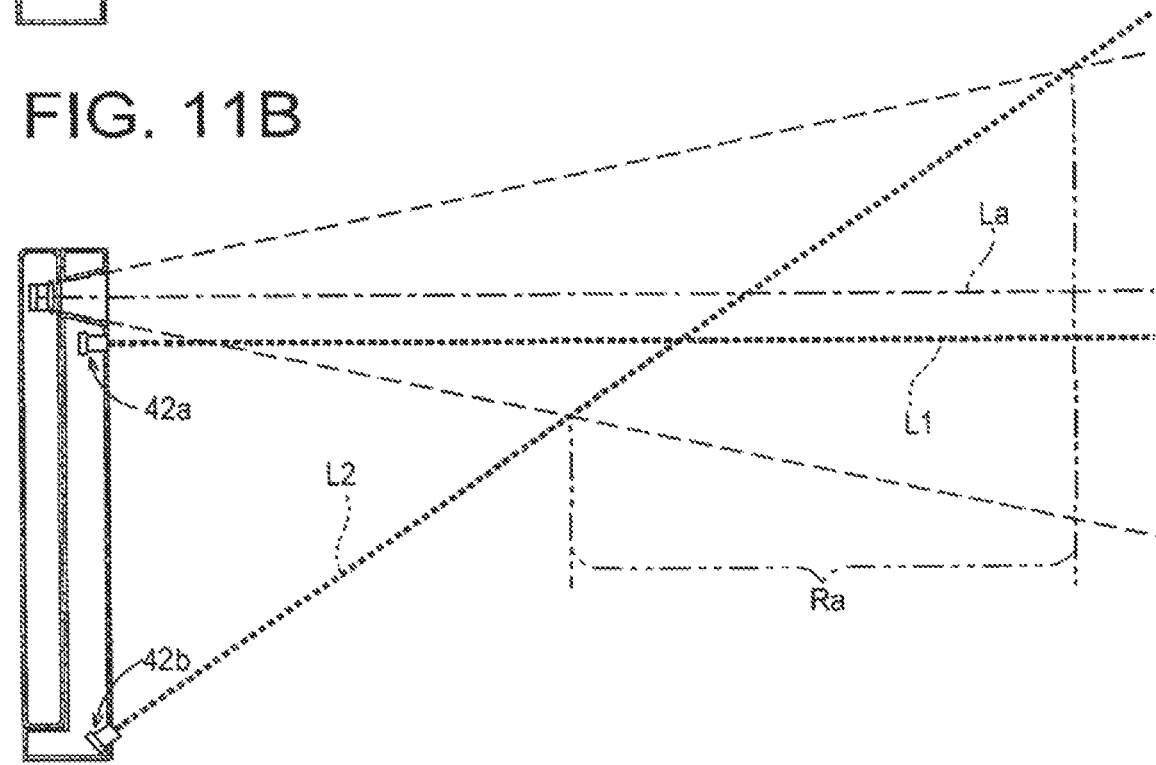

The above Modified Example (4-1) describes the example of including a single semiconductor laser 42 functioning as an aligner to direct the camera module 74 toward the symbol 6 and as a distance meter for focusing. As shown in FIG. 11B, another embodiment may include one semiconductor laser 42a functioning as an aligner and the other semiconductor laser 42b functioning as a distance meter. According to this embodiment, a photographed image acquired in a predetermined reading range Ra includes marker images of both of the semiconductor lasers 42a and 42b. These marker images included in the photographed image vary in the mutual distance between their coordinates with the reading distance. Based on such a phenomenon, the memory of the smartphone 8a stores beforehand the distance between two marker coordinates in association with the focusing positions of the lens 22. Then during the focusing processing (s16), the CPU (setting unit 90) of the smartphone 8a finds two marker coordinates and calculates the distance between these coordinates, and then extracts the focusing position corresponding to the distance between the coordinates from the memory. Then the CPU transmits a control signal to the camera module 74 so as to move the lens 22 to the extracted focusing position.

Modified Example 4-2

When the light source emits a light beam that is divergent at a predetermined irradiation angle (beam angle) relative to the optical axis La of the light-receiving system, the focusing processing may include the processing to move the lens 22 to the focusing position corresponding to a size of the marker image in the photographed image. This processing focuses on an increase or a decrease of the size of the marker image in the photographed image with a change in the length of the reading distance. More specifically the size of a marker image increases with a length of the reading distance. Such a relationship between the size of the marker image and the reading distance may be measured experimentally, and then an optimum focusing position of the lens 22 for each value of the measured reading distance may be measured experimentally. Based on these experiments, a table can be specified, including the size of a marker image in association with the optimum focusing position of the lens 22, and prior to the focusing processing (s16), such a table is stored in the memory (memory unit 76) of the computer 8. During the focusing processing (s16), the CPU (setting unit 90) of the computer 8 finds the size of the marker image in the photographed image and extracts the focusing position corresponding to the size from the memory. Then the CPU transmits a signal to the camera module 74 so as to move the lens 22 to the extracted focusing position.

Modified Example 4-3

In the first embodiment, the unit 30 may include the microcomputer 64 that can communicate with the CPU of the smartphone 8*a* via the connector 46 as shown in FIG. 4B, and the microcomputer 64 may control the semiconductor laser 42 to emit light in accordance with an instruction from the CPU. In this case, the focusing processing (s16) may include the processing to move the lens 22 to the focusing position corresponding to the detection timing of the marker image. This processing focuses on an increase of time (time to receive light) to receive reflected light of the light source with an increase of the reading distance. More specifically this focuses on the time between the light emission from the light source and the detection of a marker image that varies with the reading distance. Such a relationship between the detection time and the reading distance may be measured experimentally, and then an optimum focusing position of the lens 22 for each value of the measured reading distance may be measured experimentally. Based on these experiments, a table can be specified, including the detection time in association with the optimum focusing position of the lens 22, and prior to the focusing processing (s16), such a table is stored in the memory (memory unit 76) of the smartphone 8*a*. During the focusing processing (s16), the CPU (setting unit 90) of the smartphone 8*a* transmits an instruction to emit light to the microcomputer 64 of the unit 30. After that, the CPU continues to take an image of the subject and performs the detection processing of a marker 62 from the photographed image. Then, the CPU measures the time required to detect the marker 62. Then the CPU extracts a focusing position corresponding to the measured time from the memory. Then the CPU transmits a signal to the camera module 74 so as to move the lens 22 to the extracted focusing position.

Modified Example 4-4

In the above Modified Example (4-1) through Modified Example (4-3), the memory (memory unit 76) may store beforehand the information in the form of a function instead of in the form of a table. Such a function allows the optimum focusing position of the lens 22 to be found in association with the coordinates/size/detection time, for example, of the marker image. The CPU (setting unit 90) of the computer 8 substitutes the coordinates or the size of the detected marker image or the measured detection time of the marker 62 in such a function so as to acquire the focusing position of the lens 22, and then transmits a signal to the camera module 74 so as to move the lens 22 to the focusing position.

Modified Example 4-5

The focusing processing (s16) may be performed so that the marker image in the photographed image has the highest contrast. That is, the focusing processing may acquire images while moving the lens 22, measure the contrast of the marker image in each photographed image, and return the lens 22 to the position of the lens 22 corresponding to the photographed image having the highest contrast.

Modified Example 5

In the first embodiment, the unit 30 may include the microcomputer 64 that can communicate with the CPU of the smartphone 8*a* via the connector 46, the switch 50 connected to the input terminal 66 of the microcomputer 64, and the control circuit 68 to drive the semiconductor laser 42 in accordance with an output signal from the microcomputer 64 as shown in FIG. 4B. This microcomputer 64 monitors an input signal from the switch 50, and when detecting pressing of the switch 50, the microcomputer outputs a light-emission signal to the control circuit 68. The light-emission signal is to let the semiconductor laser 42 emit light, and is a signal to turn ON a transistor as the control circuit 68 in this example. When the transistor turns ON, the semiconductor laser 42 receiving electricity emits laser light L1 (FIG. 1). In this way, the microcomputer 64 functions as a detection unit (not illustrated) to detect the operation by the user of the switch 50 and a light-emission control unit (not illustrated) to control the light emission of the semiconductor laser 42.

In another embodiment, the microcomputer 64 may transmit a reading request to the CPU of the smartphone 8*a* to request the starting of reading processing while outputting the light emission signal. In this embodiment, when receiving the reading request, the CPU of the smartphone 8*a* starts the reading processing as stated above (FIG. 5).

Modified Example 6

Unlike the embodiments as stated above and Modified Example 2, the CPU (decoding unit 82) of the computer 8 may decode information at a part within a certain range relative to the marker image in the acquired photographed image.

Modified Example 6-1

For instance, when the CPU of the computer 8 detects a marker image during the marker detection processing (s12), the CPU recognizes a base point based on the detected marker image, sets a certain range based on the recognized base point, and decodes information from an image in the set range.

For instance, when the marker image in the photographed image is one dot, a circle, a line or a cross, the coordinates of the center point of such a marker image is recognized as the base point. When the marker image is an arrow, the coordinates of the point of the arrow is recognized as the base point. When the marker image is a frame, the coordinates of the center point of the frame is recognized as the base point.

When the marker image is one dot, a circle, a line or a cross, the region as a target of decoding is specified so as to include pixels in a certain quadrangular range having the center point of the marker image as the base point at the center. When the marker image is one arrow, the target of decoding is specified so as to include pixels in a certain quadrangular range having the arrow's point of the marker image as the base point at one of the corners. In this way, pixels in a certain range including the base point are specified as a target of decoding. When the marker image is a frame, the target of decoding is specified so as to include pixels in a certain range having the center point of the frame as the base point at the center.

Such processing can increase the decoding rate because an image to be decoded is limited to a certain range.

Modified Example 6-2

Reading processing may be performed based on the coordinates of a marker image and the coordinates of a symbol image, in addition to the marker image. More specifically when the CPU of the computer 8 detects a marker image during the detection processing (s12), then the CPU finds the marker coordinates similarly to the above. The CPU further performs the decoding processing for the entire photographed image to acquire information from all of the symbol images included in the photographed image, and finds the coordinates of each symbol image (hereinafter called "symbol coordinates") corresponding to the information. These symbol coordinates are represented in the coordinate system similar to the marker coordinates, and the center coordinates of the symbol image are recognized as the symbol coordinates, for example. When the photographed image includes a plurality of symbol images, the CPU finds the symbol coordinates of each symbol image. Then the CPU may use only the symbol information corresponding to the symbol coordinates closest to the marker coordinates. Alternatively, the CPU may use only the symbol information corresponding to the symbol coordinates positioned above the marker coordinates. Alternatively, the CPU may use only the symbol information corresponding to the symbol coordinates at a certain distance from the marker coordinates.

Modified Example 7

The reader 2 may read a two-dimensional symbol or letters instead of a one-dimensional symbol. This may be a color pattern having a plurality of colors. The reader may read a plurality of symbols at the same time. The reader may read a different types of symbols at the same time.

Modified Example 8

The unit 30 may include a magnifying lens (not illustrated) at the large through hole 36. This magnifying lens magnifies a center part of the photographing range S of the camera module 74 and forms an image on the imaging surface 24a of the image pickup device 24. The magnifying lens is disposed so that its center line coincides with the optical axis La of the light-receiving system. With such a magnifying lens, the reader can read a symbol 6 at a distant place.

Modified Example 9

The case 32 of the unit 30 may internally include a reflector (not illustrated) to bend the optical axis La of the light-receiving system upward of the unit 30. Then the unit may include, at the top face of the case 32, a through hole along which the bent optical axis pass and a through hole along which the laser light L1 of the semiconductor laser 42 directed upward passes.

Modified Example 10

The lens 22, the image pickup device 24 and the image processor 26 that make up a camera are not limited to a modular type.

The reader 2 may include any combination of these Modified Examples 1 to 10.

The present invention may be embodied in various modes through improvement, changes and modifications based on the knowledge of those skilled in the art without departing from the scope of the present invention. The scope of the present invention covers all of these modes.

What is claimed is:
1. A reader, comprising:
a computer configured to analyze an image created by a camera module and read information from a symbol included in the image; and
a unit including a light source to display a marker indicating a range photographed by the camera module,
the unit being separate from the computer,
the unit being configured to control the light source in accordance with an instruction from the computer, and
the computer is configured to display a slide bar on a graphical user interface (GUI) to receive user's input on distance information, and to analyze only an image in a specific range and to omit analyzing an image other than within the specific range.
2. The reader according to claim 1, wherein
the computer is a mobile terminal, and
the unit is externally attached to the mobile terminal.
3. The reader according to claim 1, wherein
the unit includes the camera module, and
the unit transmits the image to the computer.
4. The reader according to claim 1, wherein
the marker includes:
a range marker indicating a readable range of the symbol by the computer, and
a linear marker laterally extending in the range marker.
5. The reader according to claim 4, wherein
the computer includes:
an acquisitioner configured to acquire the image from the camera module,
a detector configured to detect the linear marker included in the acquired image, and
a decoder configured to perform decoding of pixels at the detected linear marker.

6. The reader according to claim 4, wherein
the computer includes:
- an acquisitioner configured to acquire the image from the camera module,
- a detector configured to detect the range marker included in the acquired image, and
- a decoder configured to perform decoding of pixels in the detected range marker.

7. The reader according to claim 1, wherein
the marker includes:
- a range marker indicating a readable range of the symbol by the computer, and
- a center marker indicating a center of the range marker.

8. The reader according to claim 1, wherein
the camera module includes a focus adjustable lens, and
the computer includes:
- a memory configured to store a correspondence between distance information indicating reading distances for the symbol and focusing positions of the lens,
- an input configured to encourage a user to input the distance information, and
- a setter configured to find a focusing position of the lens corresponding to the input distance information based on the correspondence and configure the camera module to move the lens to the focusing position.

9. The reader according to claim 1, wherein
the photographing range by the camera module is set based on the image in which the marker is displayed.

10. The reader according to claim 9, wherein
the marker has a line shape.

11. The reader according to claim 1, wherein
the marker includes a range marker indicating a specific range, the specific range being in the photographing range by the camera module, and
the computer is further configured to analyze only an image in the specific range and to omit analyzing an image other than the specific range.

12. The reader according to claim 1, wherein
the marker has a line shape, and
the computer is further configured to analyze only an image of a part displaying the marker and to omit analyzing an image other than the part.

13. The reader according to claim 1, wherein
the camera module includes a focus adjustable lens, and
the computer is configured to move the lens to the focusing position corresponding to a reading distance for the symbol based on a user's input or the marker.

14. The reader according to claim 1, wherein
the computer being configured to detect the marker displayed by the light source prior to analyzing the image.

15. The unit according to claim 1, wherein
the marker being output by the light source so as to be capable of being detected prior to the computer reading the information from the symbol included in the image.

16. The reader according to claim 1, wherein
the computer is further configured to repeatably focus until acquiring the distance information.

17. The reader according to claim 1, wherein
the computer is further configured to execute a reading processing while locking focusing when a user input on distance information is received.

\* \* \* \* \*